US009311213B2

(12) United States Patent  
Seto et al.

(10) Patent No.: US 9,311,213 B2  
(45) Date of Patent: *Apr. 12, 2016

(54) MODULE DATABASE WITH TRACING OPTIONS

(71) Applicant: Microsoft Technology Licensing, LLC, Redmond, WA (US)

(72) Inventors: Tetsuo Seto, Redmond, WA (US); Alexander G. Gounares, Kirkland, WA (US); Russell S. Krajec, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/455,202

(22) Filed: Aug. 8, 2014

(65) Prior Publication Data

US 2015/0066869 A1   Mar. 5, 2015

Related U.S. Application Data

(60) Provisional application No. 61/873,773, filed on Sep. 4, 2013, provisional application No. 61/874,931, filed on Sep. 6, 2013.

(51) Int. Cl.
*G06F 9/44* (2006.01)
*G06F 11/00* (2006.01)
*G06F 11/34* (2006.01)
(Continued)

(52) U.S. Cl.
CPC ........ *G06F 11/3452* (2013.01); *G06F 11/3636* (2013.01); *G06F 21/31* (2013.01); *G06F 2201/80* (2013.01)

(58) Field of Classification Search
CPC . G06F 11/3452; G06F 11/3636; G06F 21/31; G06F 2201/80
USPC ............................ 717/124–135; 714/37, 38.1
See application file for complete search history.

(56) References Cited

U.S. PATENT DOCUMENTS 6,202,199 B1 * 3/2001 Wygodny et al. ............. 717/125
6,282,701 B1 * 8/2001 Wygodny et al. ............. 717/125
7,058,928 B2 * 6/2006 Wygodny et al. ............. 717/128

(Continued)

OTHER PUBLICATIONS

International Search Report Issued in PCT Application No. PCT/IB2014/060233, Mailed Date: Nov. 11, 2014, 4 Pages.

(Continued)

*Primary Examiner* — Qing Chen
(74) *Attorney, Agent, or Firm* — Ben Tabor; Aaron Hoff; Micky Minhas

(57) ABSTRACT

A database of module performance may be generated by adding tracing components to applications, as well as by adding tracing components to modules themselves. Modules may be reusable code that may be made available for reuse across multiple applications. When tracing is performed on an application level, the data collected from each module may be summarized in module-specific databases. The module-specific databases may be public databases that may assist application developers in selecting modules for various tasks. The module-specific databases may include usage and performance data, as well as stability and robustness metrics, error logs, and analyzes of similar modules. The database may be accessed through links in module description pages and repositories, as well as through a website or other repository.

15 Claims, 11 Drawing Sheets

(51) Int. Cl.
*G06F 11/36* (2006.01)
*G06F 21/31* (2013.01)

(56) References Cited

U.S. PATENT DOCUMENTS

| | | | |
|---|---|---|---|
| 8,312,435 B2* | 11/2012 | Wygodny et al. | 717/130 |
| 2002/0087949 A1* | 7/2002 | Golender et al. | 717/124 |
| 2003/0088854 A1* | 5/2003 | Wygodny et al. | 717/130 |
| 2006/0242627 A1* | 10/2006 | Wygodny et al. | 717/128 |
| 2007/0143795 A1* | 6/2007 | Tran | 725/46 |
| 2008/0120400 A1 | 5/2008 | Keller et al. | |
| 2010/0281468 A1 | 11/2010 | Pavlyushchik | |
| 2011/0314543 A1 | 12/2011 | Treit et al. | |
| 2012/0023475 A1 | 1/2012 | Surazski et al. | |
| 2012/0079456 A1 | 3/2012 | Kannan et al. | |
| 2013/0145350 A1 | 6/2013 | Marinescu | |

OTHER PUBLICATIONS

Notice of Allowance dated Nov. 24, 2015 cited in U.S. Appl. No. 14/455,170.

* cited by examiner

MODULE DATABASE WITH TRACING OPTIONS

CROSS REFERENCE TO RELATED APPLICATIONS

This application claims priority to and benefit of U.S. Provisional Patent Application Ser. No. 61/873,773 entitled "Module Specific Tracing in a Shared Module Environment", filed 4 Sep. 2013 by Concurix Corporation, and U.S. Provisional Patent Application Ser. No. 61/874,931 entitled "Module Database with Tracing Options", filed 6 Sep. 2013 by Concurix Corporation, the entire contents of which are hereby expressly incorporated by reference.

BACKGROUND

Application tracing is one mechanism to understand and monitor an application. Tracing is a mechanism to collect data while the application executes. In some uses, application tracing may be used for monitoring the ongoing performance of an application. In other uses, application tracing may be used by a developer to understand an application, identify any problems, and improve the application.

In many computer languages and communities, some code may be distributed as modules, libraries, or other reusable components. These modules may be distributed as source code, intermediate code, executable code, or some other form, but may all share the characteristic that the modules may be reused by other programmers in many different applications.

SUMMARY

A module-specific tracing mechanism may trace the usage of a module on behalf of the module developer. The module may be used by multiple application developers, and the tracing system may collect and summarize data for the module in each of the different applications. The data may include usage data as well as performance data. Usage data may include anonymized data for each time the module may be invoked and called, and performance data may include the processing time, memory consumption, and other metrics. The module-specific tracing may be enabled or disabled by an application developer.

A tracing system may trace applications and their modules, and may make module-specific data available through various interfaces. The tracing system may collect tracer data while an application executes, and may preprocess the data into application-specific and module-specific databases. An analysis engine may further analyze and process these databases to create application-specific views and module-specific views into the data. The application-specific views may be intended for a developer of the application, while the module-specific views may have a public version accessible to everybody and a module developer version that may contain additional details that may be useful to the module developer.

A database of module performance may be generated by adding tracing components to applications, as well as by adding tracing components to modules themselves. Modules may be reusable code that may be made available for reuse across multiple applications. When tracing is performed on an application level, the data collected from each module may be summarized in module-specific databases. The module-specific databases may be public databases that may assist application developers in selecting modules for various tasks. The module-specific databases may include usage and performance data, as well as stability and robustness metrics, error logs, and analyses of similar modules. The database may be accessed through links in module description pages and repositories, as well as through a website or other repository.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Module Specific Tracing System

Figure 1:
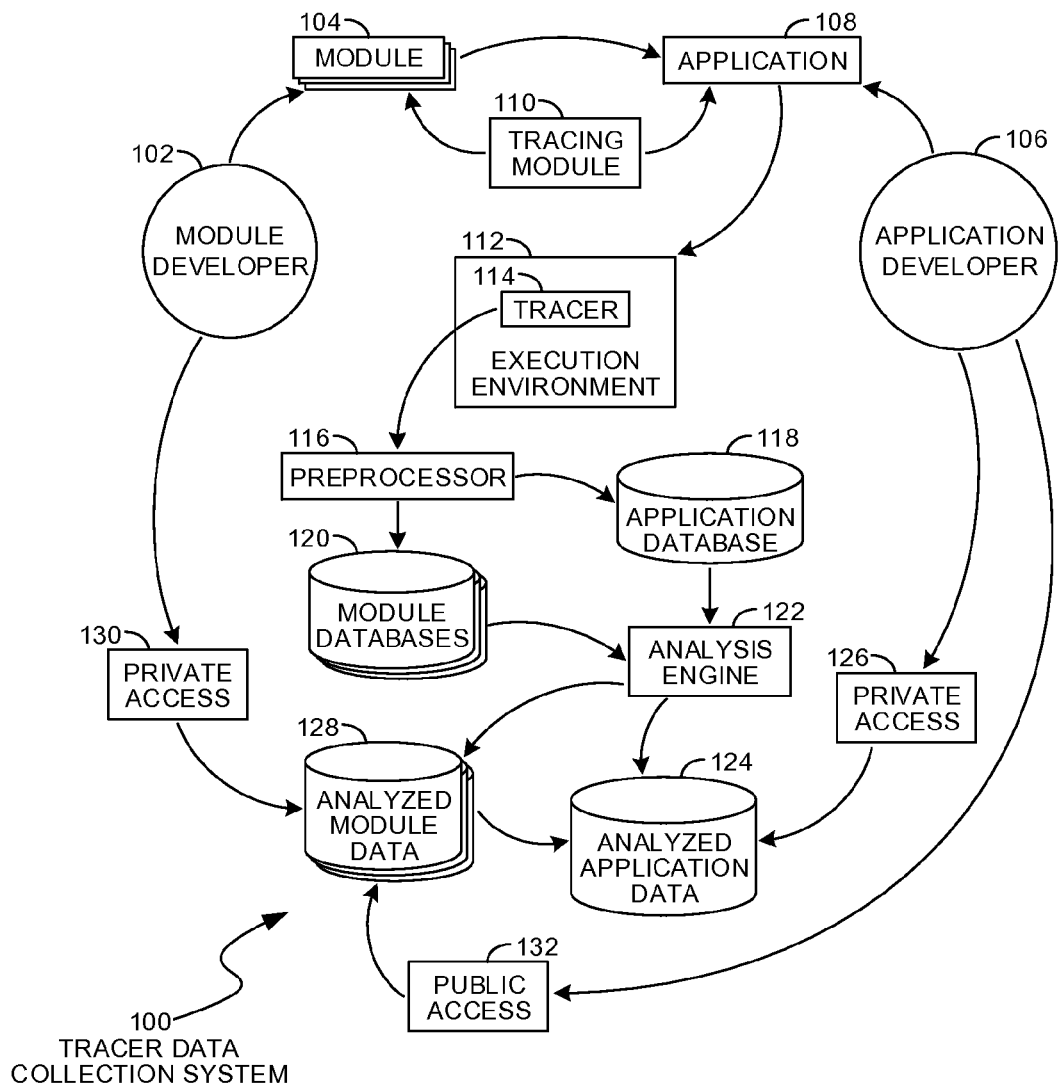
FIG. 1 is a diagram illustration of an embodiment showing a system for tracing applications and modules.

A tracing system may collect data about modules that may be incorporated into multiple applications. The modules may be shared sets of code that may be distributed among developers, and the developers may select various modules to incorporate into their applications.

Some of the modules may incorporate a tracing mechanism, which may trace the operations of the module and store tracer data. The tracer data may include usage data, which may describe the number of uses, timestamps for uses, conditions under which the module was used, and other usage data. The tracer data may also include performance data, such as the amount of time taken to execute, amount of computational resources, memory resources, network resources, or other resources consumed during execution.

The module specific tracing system may consolidate the raw data for the module developer and for other users. Some embodiments may include a detailed view of the data for module developers and a less detailed view for other users. Module developers may use the tracer data to identify portions of the module that may be executing poorly or have some other issue. The other users may examine the module tracing data to determine a general notion of performance of the module and may use the tracing data as part of the criteria for comparing and selecting one module over another.

In one use scenario, a module developer may incorporate a tracing mechanism in the module. The tracing mechanism may operate within the confines of the module and only trace code within the module. In many cases, the tracing mechanism may be able to gather some metadata about the environment in which the module was executed.

The tracing mechanism may gather tracing data while the module executes in an application. The tracing mechanism may transmit the tracing data to a database for analysis. In many cases, the application developer may have an option to turn off the tracing mechanism or set various options for the tracing mechanism, even though the tracing mechanism may have been initially incorporated and configured by the module developer.

In the use scenario, the tracing mechanism may gather usage and performance data that the module developer may use to improve the module. These tracer data may help the module developer understand which portions of the module are used more frequently than others, which may help the module developer prioritize improving the most used portions. The tracer data may also help identify code that is less reliable than other code, and the data may be used to generate robustness or fragility measurements of individual functions.

In another use scenario, an application developer may access the module specific data to gauge whether or not to use the module in a particular application. The developer may have identified several modules that may serve a particular purpose, and then may use the tracer data as one metric to select between the modules. The application developer may investigate the module's reliability and robustness by viewing the performance and usage data.

Tracing System for Application and Module Tracing

A tracing system may provide tracing for applications and modules using similar techniques and mechanisms yet with some differences. The tracing system may gather tracing data while an application executes, and that data may be shared with the application developer, the module developer, and a wider audience of potential module users. In some cases, the wider audience may be public at large.

Each of the three audiences may have different uses for the tracer data and different security concerns. The application developer may view the application as a trade secret, and may not wish certain tracer information be shared outside of the team developing the application. The module developer may wish to collect data on how the module performed, but may not wish for some details of the operations be disclosed to the general public. The public at large may include developers who may be building their own applications, and these developers may wish to view the module specific data to determine whether or not the module is suited for their use.

The application developer may request tracing be performed on their application. Such tracing data may include tracing information that may be proprietary, such as the values of data elements handled by the application, the application architecture and function, source code of the application, and other information. Because the application developer may consider this as secret or proprietary, such information may be processed and stored in a database that may be separate from the data that may be shared with the module developer and the public at large.

The data collected for each module may be collected when the application is executed. As such, module-specific data collection may be a subset of the available data because the module-specific data may be shared with a module developer who may be another party other than the application development team. In some cases, the module developer may be a third party who may create and disseminate a module without knowing who may use the module in their application.

The module-specific data may be collected as part of executing an application, but only those subsets of data that the application developer may permit to be collected may actually be collected. In many cases, the application developer may have a set of configuration settings that may enable or disable certain types of data to be collected. In some cases, certain data elements may not be collected at all for module-specific tracing.

In some cases, an application developer may disable or not install application-level tracing but may permit a module developer to collect tracer data as a module executes within the application. In such situations, an application may execute without tracing, but when the module is executed, the tracing may occur only within the module. Such module-specific tracing may be processed and made available to the module developer and, in some cases, a wider audience. In such cases, the module-specific tracing may be much more limited in scope than if the application developer had enabled tracing for the entire application.

When an application developer enables tracing for an entire application and permits tracing for individual modules, the application developer may be able to view a complete set of the data relating to each module, with a subset of the data being transmitted and processed in the module-specific manner. In such a situation, the application developer may have access to a superset of data for a specific module than the module developer would be able to access.

Module Database with Tracing Options

A module database may use tracing data to decorate descriptions of modules. The module database may list various modules that may be incorporated into applications. The decorations may include performance and usage data, as well as summaries and other data that may be useful for evaluating modules and comparing modules against each other.

The module database may be constructed by analyzing tracer data gathered while an application executes a module. A tracer may gather performance and usage data for the module during execution, and these data may be aggregated, summarized, and displayed for a user to browse.

The tracer data may include actual usage of the module by third parties, as well as the manners in which the module was incorporated into various applications. The application developers may select and use a module but may only exercise a subset of the module's functionality. In many cases, a module may have many different functions, methods, objects, or other components, yet an application developer may use one a small subset of the components.

The third party usage may be gathered when the application is used by an end user. For example, an application may consist of an app that runs on a mobile device along with a backend component that executes on a server in a datacenter. The end user may exercise the application in many different manners, some of which may exercise the module and some which may not.

The usage data may reflect the popularity and usefulness of the various components of the module. When these data may be presented to the module developer or to other application developers, the data may be arranged as a popularity score or percentage.

The usage data may be tracked over time to determine which applications continue to use the module and which modules are being included and removed from various applications. In many cases, an application developer may select a module, use the module for a short period of time, then switch to another module. In such a situation, the application developer made a conscious decision to switch from one module to another, indicating the application developer's preference for the second module over the first. This preference may be valuable to another application developer who may be considering the use of the first module.

The performance data for the various functions or components within the module may be used to develop a reliability or robustness metric for each function. The reliability or robustness metric may be an indicator of how fragile a function may be, and may be useful for an application developer when selecting specific functions for incorporation in their application. The reliability or robustness metric may be based on the variance of performance metrics or other factors.

The module database may include graphical or other indicators of the architecture of the module. In many cases, a module may include several other modules, each of which may be invoked when an application executes. Such complex interactions may not be readily apparent from reading the source code or from other sources. The graphical representation of the module may give an application developer a visual indication of the complexity of the module and the various dependencies.

The module database may roll up or aggregate various metrics about the dependencies of a module to generate data for a given module. The various use and performance data of the modules may be apportioned to the various modules that actually perform the underlying functions. For example, a module may call a second module to perform certain tasks, and one of those tasks may be performed by a third module. In such a case, the first module's function may be displayed along with the second and third module's functions and the data collected from each of the dependencies.

Throughout this specification and claims, the term "module" is used to define a group of reusable code that may be incorporated into an application. A module may be known as a 'library', 'subroutine', or some other notion. For the purposes of this specification and claims, these terms are considered synonymous.

The "module" may be code that is arranged in a way that multiple applications may access the code, even though the applications may have no connection with each other. In general, a "module" may be code that is configured to be reused. In some cases, a module may be reused within the scope of a large application, while in other cases, the module may be shared to other application developers who may use the module in disparate and unconnected applications.

Many programming languages and paradigms have a notion of a "module" or library, where the module may have a defined interface through which an application may invoke and use the module. Some paradigms may allow a programmer to incorporate a module in a static manner, such that the module code does not further change after the application is written and deployed. Some paradigms may allow for dynamic libraries, which may be loaded and invoked at runtime or even after execution has begun. The dynamic libraries may be updated and changed after the application may have been distributed, yet the manner of invoking the libraries or modules may remain the same.

Modules may be distributed in source code, intermediate code, executable code, or in some other form. In some cases, modules may be services that may be invoked through an application programming interface.

Throughout this specification and claims, the terms "profiler", "tracer", and "instrumentation" are used interchangeably. These terms refer to any mechanism that may collect data when an application is executed. In a classic definition, "instrumentation" may refer to stubs, hooks, or other data collection mechanisms that may be inserted into executable code and thereby change the executable code, whereas "profiler" or "tracer" may classically refer to data collection mechanisms that may not change the executable code. The use of any of these terms and their derivatives may implicate or imply the other. For example, data collection using a "tracer" may be performed using non-contact data collection in the classic sense of a "tracer" as well as data collection using the classic definition of "instrumentation" where the executable code may be changed. Similarly, data collected through "instrumentation" may include data collection using non-contact data collection mechanisms.

Further, data collected through "profiling", "tracing", and "instrumentation" may include any type of data that may be collected, including performance related data such as processing times, throughput, performance counters, and the like. The collected data may include function names, parameters passed, memory object names and contents, messages passed, message contents, registry settings, register contents, error flags, interrupts, or any other parameter or other collectable data regarding an application being traced.

Throughout this specification and claims, the term "execution environment" may be used to refer to any type of supporting software used to execute an application. An example of an execution environment is an operating system. In some illustrations, an "execution environment" may be shown separately from an operating system. This may be to illustrate a virtual machine, such as a process virtual machine, that provides various support functions for an application. In other embodiments, a virtual machine may be a system virtual machine that may include its own internal operating system and may simulate an entire computer system. Throughout this specification and claims, the term "execution environment" includes operating systems and other systems that may or may not have readily identifiable "virtual machines" or other supporting software.

Throughout this specification and claims, the term "application" is used to refer to any combination of software and hardware products that may perform a desired function. In some cases, an application may be a single software program that operates with a hardware platform. Some applications may use multiple software components, each of which may be written in a different language or may execute within different hardware or software execution environments. In some cases, such applications may be dispersed across multiple devices and may use software and hardware components that may be connected by a network or other communications system.

Throughout this specification, like reference numbers signify the same elements throughout the description of the figures.

In the specification and claims, references to "a processor" include multiple processors. In some cases, a process that may be performed by "a processor" may be actually performed by multiple processors on the same device or on different devices. For the purposes of this specification and claims, any reference to "a processor" shall include multiple processors which may be on the same device or different devices, unless expressly specified otherwise.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is an illustration of an example embodiment 100 showing a tracer data collection system. Embodiment 100 may be an overview of a process that collects tracer data from an application. The tracer data may fall into application-specific or module-specific classifications, and may be handled differently based on the classification.

A tracer may be incorporated into individual modules or an application as a whole. The tracer output may be used to populate a module database, which may be used by application developers to evaluate, compare, and select modules for their application. The module database may include records for each module for which the tracing system has gathered data.

In some use cases, a module developer may incorporate a tracing mechanism into a module. In such a case, each time the module is incorporated into an application and executed, the embedded tracer may collect data for that module. Unless the tracer is configured otherwise, the tracer may gather data for that module but not for the remainder of the application.

The tracer data may be accessed in multiple manners. Module developers may access tracer data for their modules and view more detailed tracer data than the general public, which may have access to a subset of the tracer data for the module. Application developers may access application-specific data, which may be more detailed than the data available to the module developers or the general public.

As described above, the three classes of audiences may have different uses of the data and different security concerns. For the application developer, the application may be a proprietary project that may include trade secrets or other information that the application developer may not wish to share. This application-specific data may include, for example, the control and sequence of the application, data types handled by the application, the raw data processed by the application, and other information that may be proprietary. As such, the application-specific data may be stored in a separate database than module-specific data and access to the application-specific data may be limited to authorized users.

In many cases, the module developer may have created and distributed a module so that application developers may reuse the module. Module developers may be commercial software companies as well as open source software developers. Such developers may desire to see their modules in use, either for commercial purposes or for the satisfaction of contributing to the community.

The tracer data that may be collected from an application but made available to the module developers may be sanitized, anonymized, or otherwise scrubbed to remove proprietary information from the data. Such operations may limit the application-specific information in the module traces, but may enable the module developer to have access to the module specific data.

A module developer may access module-specific data to monitor the deployment and use of the module, as well as to identify performance issues with the module. The module-specific data may also be made available to a wider audience, such as the general public. The general public may make use of the module-specific data to compare and select modules.

A module developer 102 may contribute modules 104, which may be used by an application developer 106 to build an application 108. A tracing module 110 may be incorporated into individual modules 104 or into the application 108. When a tracing module 110 is incorporated into one or more modules 104, those modules may be traced. When a tracing module 110 is incorporated into the application 108, all of the application 108 may be traced, including any modules included in the application 108.

The application 108 may be executed in an execution environment 112. During execution, a tracer 114 may gather data, which may be passed to a preprocessor 116. In many cases, the tracer 114 may gather data and transmit those data to the preprocessor 116 on a periodic basis.

The preprocessor 116 may perform lightweight analyses, formatting, or other processing, then store application-specific data in an application database 118 and module-specific data in various module databases 120. In many cases, the module databases 120 may be configured with a separate database for each module that may be traced.

An analysis engine 122 may perform further analysis of the stored data to produce analyzed application data 124 or analyzed module data 126, respectively. The analysis engine 122 may perform many different types of analyses, including analyzing historical data, summarizing usage and performance statistics, graphing and charting data, and other analyses. In some cases, the analysis engine 122 may perform analyses on demand, meaning that some analyses may be performed when the analyzed data may be requested. In other cases, the analysis engine 122 may perform analyses ahead of time so that the analyzed data may be readily available when requested.

A module developer 102 may have private access 130 to the analyzed module data 128. The module developer's private access of the module-specific data may include details about performance and usage. In contrast, an application developer 106 may have public access 132 to the analyzed module data 128, which may contain fewer details and only a subset of the data available through the private access 130 of the module developer 102.

The public access 132 may include summaries of the tracer data collected for the module, including performance and usage statistics. An example of such a user interface may be found later in this specification.

An application developer 106 may have private access 126 to the analyzed application data 124. This access may include extensive data regarding the performance of the application as a whole, including the performance of the various modules. In some cases, the application developer 106 may be able to access more data or a different set of data than a module developer 104. For example, an application developer 106 may be able to access parameter values passed to a module, where the parameter values may be proprietary and not available to the module developer 104.

The application developer 106 may have control over which types of data may be made available to the module databases 120. For example, the application developer 106 may fully turn off any sharing of the module-specific data, but such data may still be collected, stored, and made available through the private access 126 of the application developer 106.

The application developer 106 may place various limits on the data that may be shared in the module databases. For example, the application developer 106 may permit usage statistics to be collected, but may not permit values of variables to be collected. The application developer 106 may establish that the data may be obfuscated or anonymized prior to being included in the module databases 120.

Figure 2:
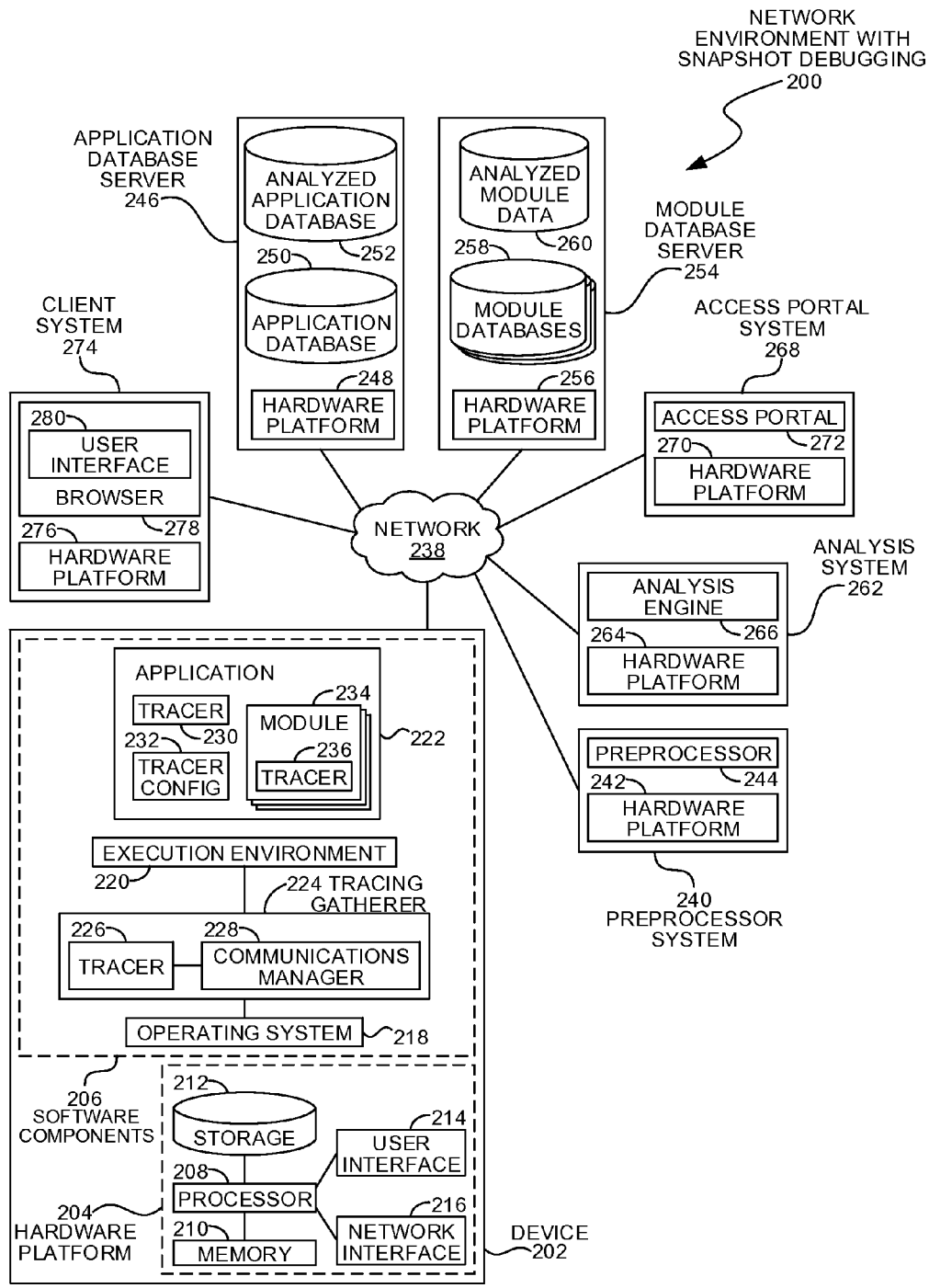
FIG. 2 is a diagram illustration of an embodiment showing a network environment with devices that may collect and view application and module trace data.

FIG. 2 is a diagram of an embodiment 200 showing components that may collect data when an application executes and present various user interfaces showing the collected data. The example of embodiment 200 is merely one example of a multi-device system that may generate and view tracer data. Other architectures may include single device and multiple device architectures.

The architecture of embodiment 200 includes a device 202 on which the tracer data may be collected, as well as several other devices for storing and processing different elements of the collected data. A client device may present and view the collected data. In other embodiments, some or all of the functions illustrated may be combined into one or more devices.

The diagram of FIG. 2 illustrates functional components of a system. In some cases, the component may be a hardware component, a software component, or a combination of hardware and software. Some of the components may be application level software, while other components may be execution environment level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 illustrates a device 202 that may have a hardware platform 204 and various software components. The device 202 as illustrated represents a conventional computing device, although other embodiments may have different configurations, architectures, or components.

In many embodiments, the device 202 may be a server computer. In some embodiments, the device 202 may still also be a desktop computer, laptop computer, netbook computer, tablet or slate computer, wireless handset, cellular telephone, game console or any other type of computing device.

The hardware platform 204 may include a processor 208, random access memory 210, and nonvolatile storage 212. The hardware platform 204 may also include a user interface 214 and network interface 216.

The random access memory 210 may be storage that contains data objects and executable code that can be quickly accessed by the processors 208. In many embodiments, the random access memory 210 may have a high-speed bus connecting the memory 210 to the processors 208.

The nonvolatile storage 212 may be storage that persists after the device 202 is shut down. The nonvolatile storage 212 may be any type of storage device, including hard disk, solid state memory devices, magnetic tape, optical storage, or other type of storage. The nonvolatile storage 212 may be read only or read/write capable. In some embodiments, the nonvolatile storage 212 may be cloud based, network storage, or other storage that may be accessed over a network connection.

The user interface 214 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 216 may be any type of connection to another computer. In many embodiments, the network interface 216 may be a wired Ethernet connection. Other embodiments may include wired or wireless connections over various communication protocols.

The software components 206 may include an operating system 218 on which various software components and services may operate. Depending on the embodiment, the application 222 may be executed in an operating system 218 or in an execution environment 220. An execution environment 220 may have memory management, process scheduling, and other components that may manage application execution in a similar manner to an operating system 218.

A tracing gatherer 224 may work with either the operating system 218 or execution environment 220. The tracing gatherer 224 may include a tracer 226 and a communications manager 228. The tracer 226 may monitor the operations of the application 222, while the communications manager 228 may transmit the tracer data to a preprocessor system 240.

The tracer 226 and communications manager 228 may be components of a tracer that may be included in the application 222. The application 222 may have a tracer 230 which may trace the entire application 222, including all of the modules 234. When a module developer wishes to trace their module, a tracer 236 may be included in the specific module 234 to be traced.

The application 222 may include a tracer configuration 232 which may define different parameters for the tracer. In some cases, the tracer configuration 232 may define which data elements may be collected, the precision of the data being collected, which data elements may be shared with module developers, and other items. In some cases, the tracer configuration 232 may define one configuration for one module and a different configuration for another module.

The communications manager 228 may package and transmit tracer data to a preprocessor system 240, which may be accessed over a network 238. The preprocessor system 240 may have a hardware platform 242, which may be similar to the hardware platform 204, and on which a preprocessor 244 may operate.

The preprocessor 244 may receive tracer data and perform some preliminary processing prior to storing the data in the application database server 246 or the module database server 254. In many cases, the preprocessor 244 may be designed to handle a high volume of tracer data.

The application database server 246 may have a hardware platform 248, which may be similar to the hardware platform 204, on which two databases may operate. An application database 250 may contain application-specific tracer data in raw or preprocessed form. An analyzed application database 252 may contain analyzed application data that may be ready for viewing by an application developer.

The module database server 254 may have a hardware platform 256, which may be similar to the hardware platform 204, on which two databases may operate. A module database 258 may contain module-specific tracer data in raw or preprocessed form. An analyzed module database 260 may contain analyzed module data that may be ready for viewing by a module developer or a third party.

An analysis system 262 may have a hardware platform 264, which may be similar to the hardware platform 204, on which an analysis engine 266 may execute. The analysis engine 266 may perform various analyses of the application tracer data or module tracer data. The analyses may include summarizing the data, combining the tracer data with other data sources, visualizing the data, or other operations on the data.

An access portal system 268 may have a hardware platform 270, which may be similar to the hardware platform 204, on which an access portal 272 may execute. The access portal 272 may be a web service or other application that may gather data from the analyzed application database 252 or the analyzed module database 260 for display on a client system 274. The access portal 272 may include authentication systems, user account and login systems, billing and accounting systems, and other functions.

The client system 274 may have a hardware platform 276, which may be similar to the hardware platform 204, on which a browser 278 may execute. The browser 278 may be used to access the access portal 272 and generate a user interface 280. The user interface 280 may be different based on the user and the user's credentials. For example, application developers may be able to view application data for their applications, as well as the module database for third party or general consumption. Similarly, a module developer may be able to see detailed module-specific data for their modules but not for other modules or for applications. A third party may be able to view module information permitted for general consumption but not be able to access application data or detailed module-specific data.

Figure 3:
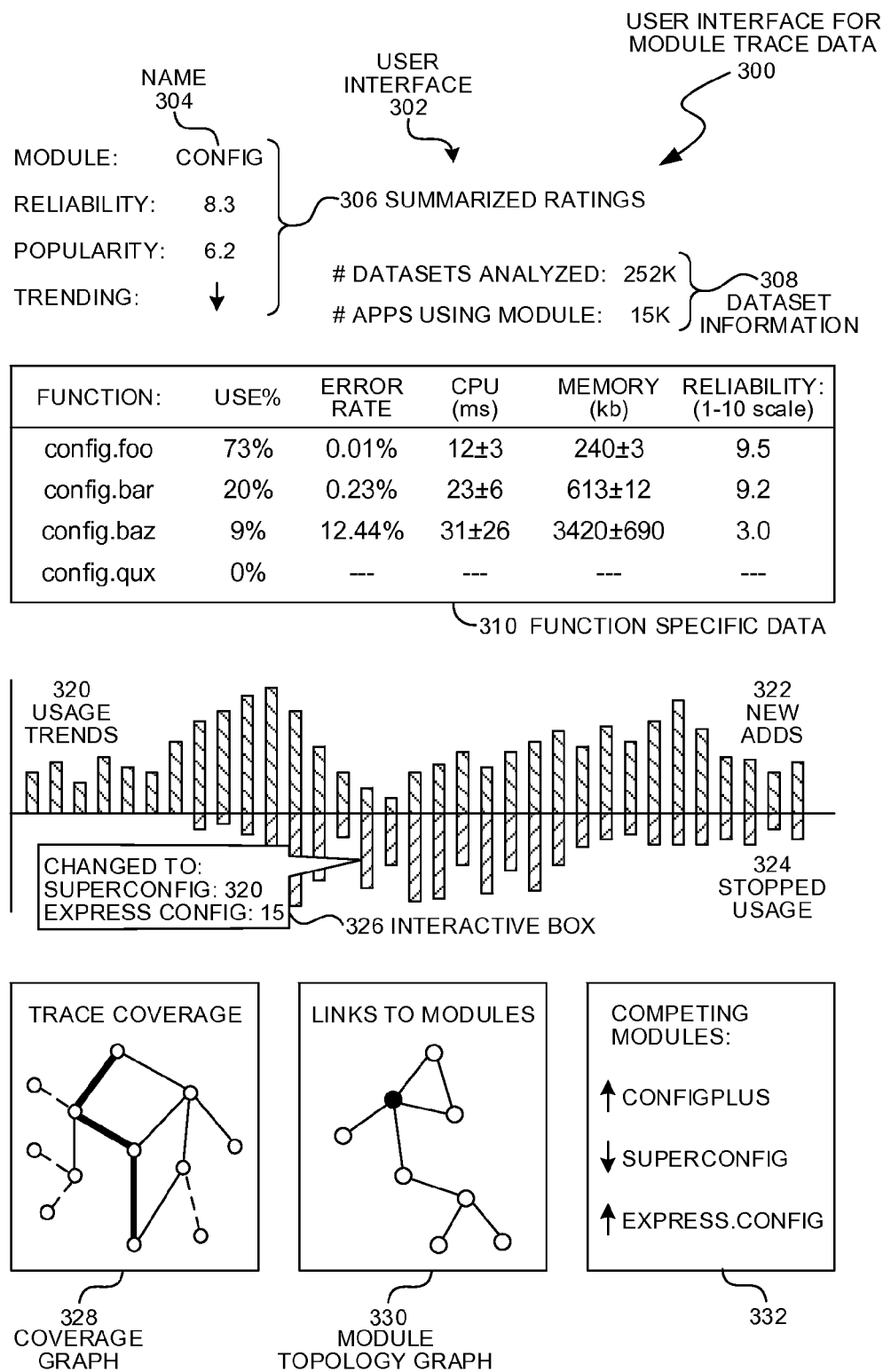
FIG. 3 is a diagram illustration of an example embodiment showing a user interface for module trace data.

FIG. 3 is an example embodiment 300 showing a user interface for module trace data. Embodiment 300 is a user interface 302 that may be an example of a publically available module-specific user interface for a module named CONFIG.

The user interface 302 may represent the type of data that may be publically available after being gathered from a tracer. The tracer may be a module-specific tracer or may be an application-level tracer. The type of data illustrated in the example of embodiment 300 may be merely illustrative as possible types of data and possible methods for aggregating and displaying the data. Other embodiments may have different types of data and mechanisms for communicating the data.

A name 304 may identify the module as CONFIG. A set of summarized ratings 306 may give a user a high level summary of the module's reliability, popularity, and how the module is trending. Reliability may be a metric derived from usage and performance data that may reflect the robustness or fragility of the module as a whole.

Popularity may be a metric that reflects the community's usage of the module. In some cases, the popularity may reflect the module's popularity in comparison to the community as a whole, in comparison to comparable modules, or in some other context.

A trending indicator may indicate if the module is increasing or decreasing in overall popularity and robustness. If the module is being used less and less or if the subsequent releases of the module are poorer performing than previous releases, the trend indicator may be down. Conversely, if the module is gaining users and each release of the module increases reliability, the trend may be upwards.

The reliability, popularity, and trending indicators are merely three examples of high level summary indicators that may be useful for a user interface describing a particular module.

A set of dataset information 308 may display the quantity of data that may underlie the displayed data. In the example, the number of datasets analyzed may be 252,000 and the number of applications using the module may be 15,000. These numbers may lend credibility to the overall data, giving the views confidence that the performance and usage data are based on a statistically significant population of data.

A set of function-specific data 310 may show observations for individual functions within a module. Many modules may include multiple functions, objects, or other components, each of which may be called or invoked individually. In the example, lines 314, 316, 318, and 320 may illustrate summary data for config.foo, config.bar, config.baz, and config.qux, respectively.

The type of function-specific data may include a use percentage, which may indicate which of the functions are used the most. In the case of config.qux, the use percentage may be 0, which may occur when no trace data exists for the function. In one example of an analysis routine, the source code for the config module may be read to identify each of the available functions. The list of functions may be compared with the tracer data to generate some of the function specific data 310.

An error rate may be determined for each function, as well as the CPU consumption and memory consumption. The resource consumption of CPU and memory may be given as a mean with a standard deviation. The standard deviation may be one metric of a function's stability or reliance. A reliability score for the function may also be included. The reliability score may be determined using an algorithm or heuristic that may capture the variance in resource consumption.

A graph of usage trends 320 may be one mechanism that shows usage of the function over time. In the case of the graph of usage trends 320, the top portion 322 of the graph may show new applications that add the module, while the bottom portion 324 may show applications that no longer use the module.

In some cases, a module may be added to an application during an initial phase, then removed later when an application developer elects to change out the module for another one. This usage pattern is one mechanism that may indicate that the second module may be better suited for the application that the current module. When a tracing system can capture or infer such behavior, the desirability of the second module may be strongly indicated and the undesirability of the first module may also be strongly indicated. These types of patterns may be very valuable feedback that may be passed to the module developer who may investigate and improve their module, as well as an application developer who may be searching for a module.

The graph may be interactive, and an example interactive box 326 may be placed on the user interface when a user hovers or clicks on one of the bars in the graph. The interactive box 326 may show underlying data for the selected bar.

A coverage graph 328 may visually illustrate the components of the module for which trace data exists. An example of a coverage graph may be found later in this specification.

Similarly, a module topology graph 330 may visually illustrate the links between the current module and other modules that the current module may call. An example of a module topology graph may be found later in this specification.

A competing modules area 332 may list similar or competitive modules to the current module. The modules listed may have hot links, buttons, or other mechanisms that may cause the user interface to change to that module. The competing modules may include indicators showing the relative strength of the other modules, the module's trends, or some other indicators.

Figure 4:
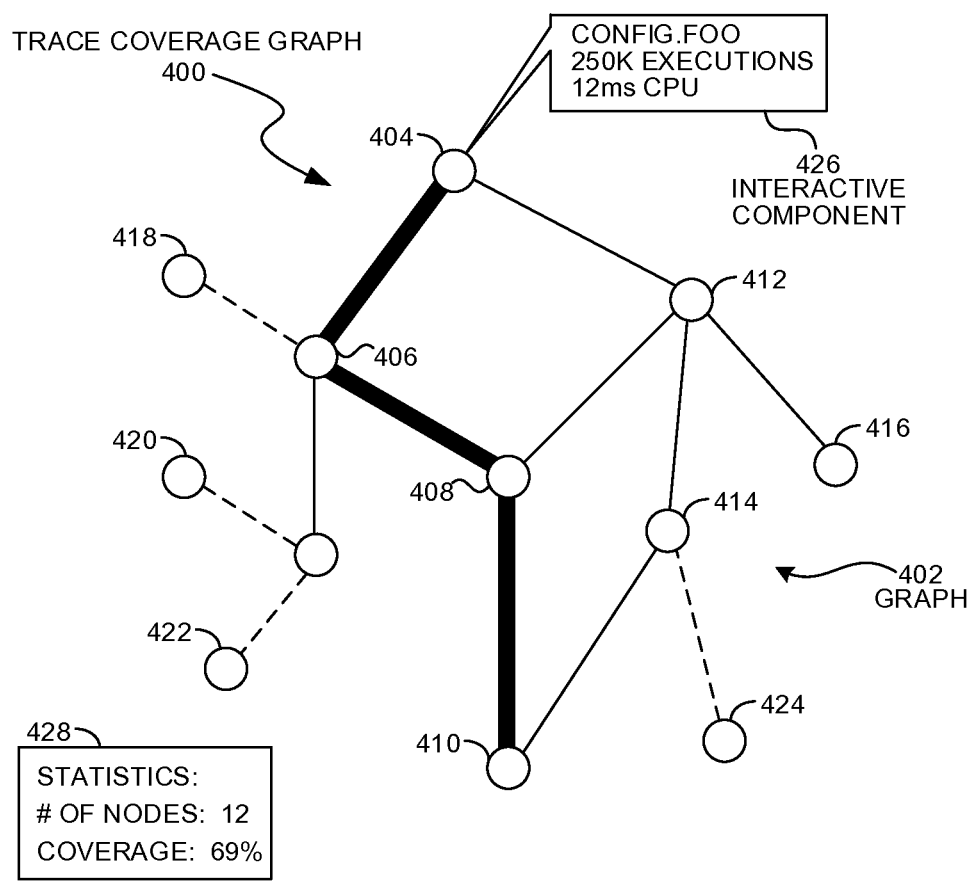
FIG. 4 is a diagram illustration of an embodiment showing an example trace coverage graph.

FIG. 4 is an example diagram of an embodiment 400 showing a trace coverage graph. The graph 402 may show various functions or components of a module as the nodes of the graph. The edges of the graph may reflect the connections or sequences of execution of the nodes, and may be drawn to reflect amount of data that were used to generate the coverage graph.

In many embodiments, each of the nodes of graph 402 may be labeled with references to the executable code represented by each of the nodes. For the sake of simplicity in the figure, such labels have been removed.

In the example of embodiment 400, nodes 404, 406, 408, and 410 may be connected with thick, heavy lines. Such lines may indicate that a large amount of trace data may be present for that sequence of execution. In contrast, the sequence of node 404, 412, 414, and 416 may have much less supporting data. In the case of nodes 418, 420, 422, and 424, the dashed lines may indicate that no trace data may be available. In such a case, the code associated with nodes 418, 420, 422, and 424 may never have been exercised by an application.

The graph 402 may be an interactive graph. As an example of an interaction, a user may hover, click, select, or otherwise indicate node 404 and an interactive component 426 may be displayed. The interactive component 426 may display additional underlying data about the node.

Figure 5:
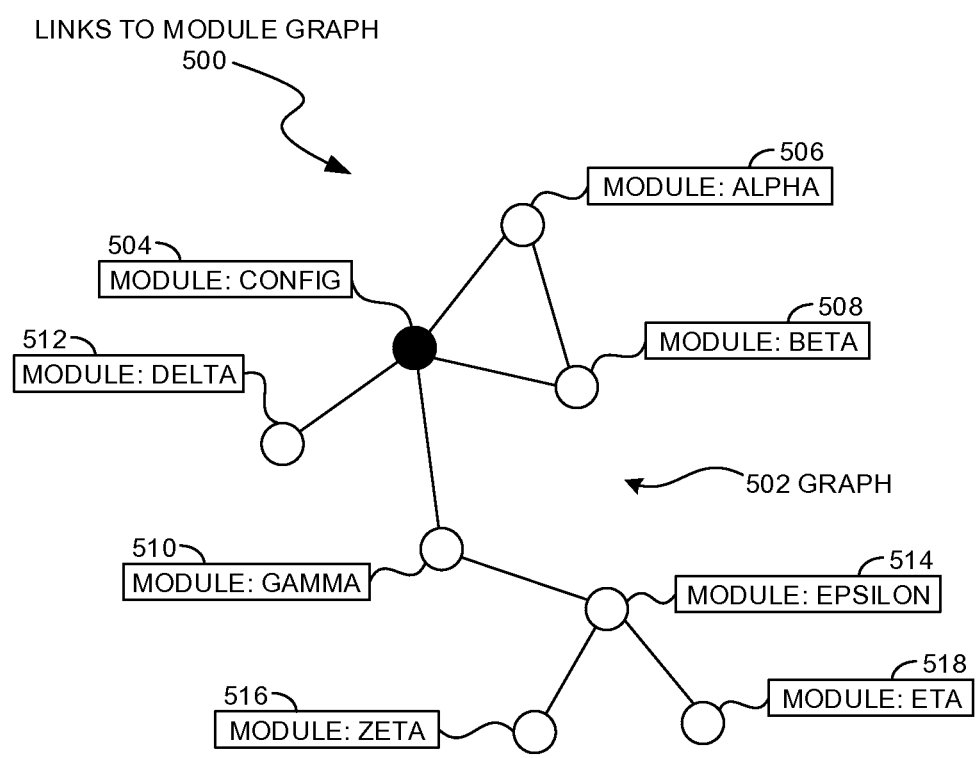
FIG. 5 is a diagram illustration of an embodiment showing an example module topology graph.

FIG. 5 is an example diagram of an embodiment 500 showing a module topology graph. The graph 502 may show a module and its dependencies, which may be other modules that may be included or called from the base module. The nodes of the graph may reflect the base module and its dependencies. The edges of the graph may reflect the connections or function calls to the dependent modules.

The graph 502 may be a visual image of the call structure of a module, and may be used to give a user a graphical view of the complexity and dependencies of a module.

A module config 504 may be illustrated as a shaded or highlighted node. This node may represent the base node for the graph. The nodes 506, 508, 510, 510, 512, 514, 516, and 518 may represent modules alpha, beta, gamma, delta, epsilon, zeta, and eta, respectively. The interconnections illustrate the function calls or other dependencies between modules.

In the example of embodiment 500, the module config 504 is shown to call node 510, module gamma, which in turn calls node 514, module epsilon. Module epsilon, node 514, calls modules zeta and eta, as represented by nodes 516 and 518. This structure may communicate to a viewer how module eta on node 518 relates to module config 514.

Figure 6:
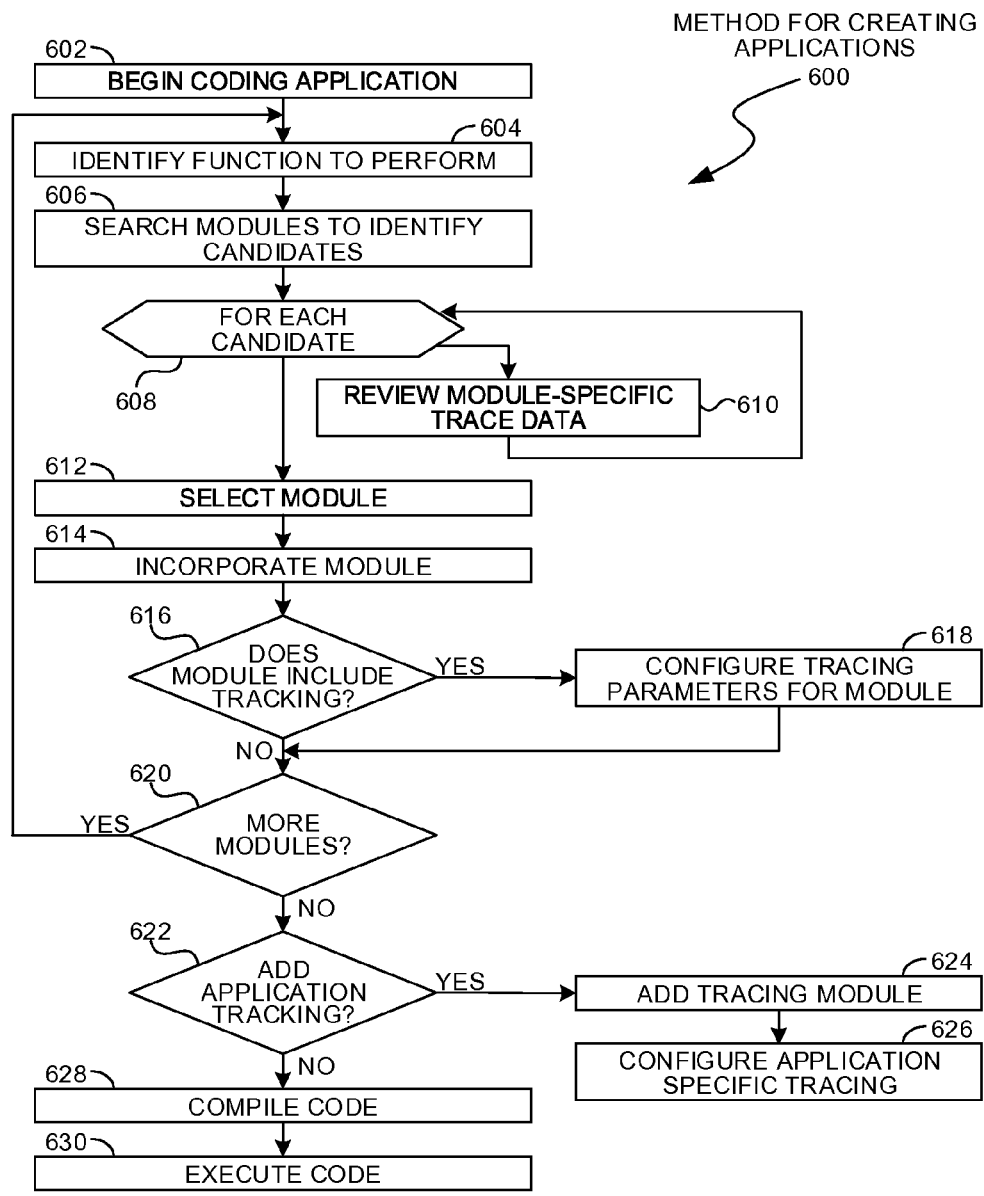
FIG. 6 is a flowchart illustration of an embodiment showing a method for creating applications.

FIG. 6 is a flowchart illustration of an embodiment 600 showing a method for creating applications. Embodiment 600 illustrates a general method that an application developer may use to create an application that includes one or more modules or libraries.

A developer may begin coding an application block 602. While coding, the developer may identify a function in block 604 that may prompt a search in block 606 for modules that may perform the function. From the list of candidate modules in block 606, the developer may evaluate each candidate in block 608.

The developer may examine the module-specific trace data in block 610 for each of the candidate modules. An example of such data may be found in the user interface of embodiment 300. From these data, the developer may be able to select an appropriate module in block 612 and incorporate the module into the application in block 614.

If the module developer has added tracing in block 616, the application developer may be able to configure various tracing parameters for the module in block 618. The tracing parameters may allow the application developer to select different options for the tracer.

The tracing parameters may be configured in many different manners to allow the application developer to control how the module may be traced. The module tracing may be requested by a module developer to address specific goals that the module developer may have, yet the application developer may have the final approval and control over how the module tracing may occur. In many cases, the application developer may be able to completely disable tracing for the module, as well as to limit or expand some of the parameters that a tracer may collect.

The tracing frequency may be part of the tracer configuration. In many embodiments, tracing may consume processing and memory resources. As such, the tracing may be performed on a sampling basis or may have other architectures that limit the amount of resources consumed by tracing.

The application developer may be incented to permit tracing for the module because the module tracing data may be fed back to the module developer to help improve the module, as well as to further populate a public database for the module. At this point, the application developer may have already accessed the public database in block 610 and may wish to give back to the community by permitting the module tracing.

If the application developer identifies another function that may be implemented in a module in block 620, the process may return to block 604, otherwise the process may continue to block 622.

In block 622, the application developer may wish to add application specific tracing. If so, a tracing module may be added in block 624 and the application specific tracing may be configured in block 626.

The application developer may compile the code in block 628 and execute the code in block 630.

Figure 7:
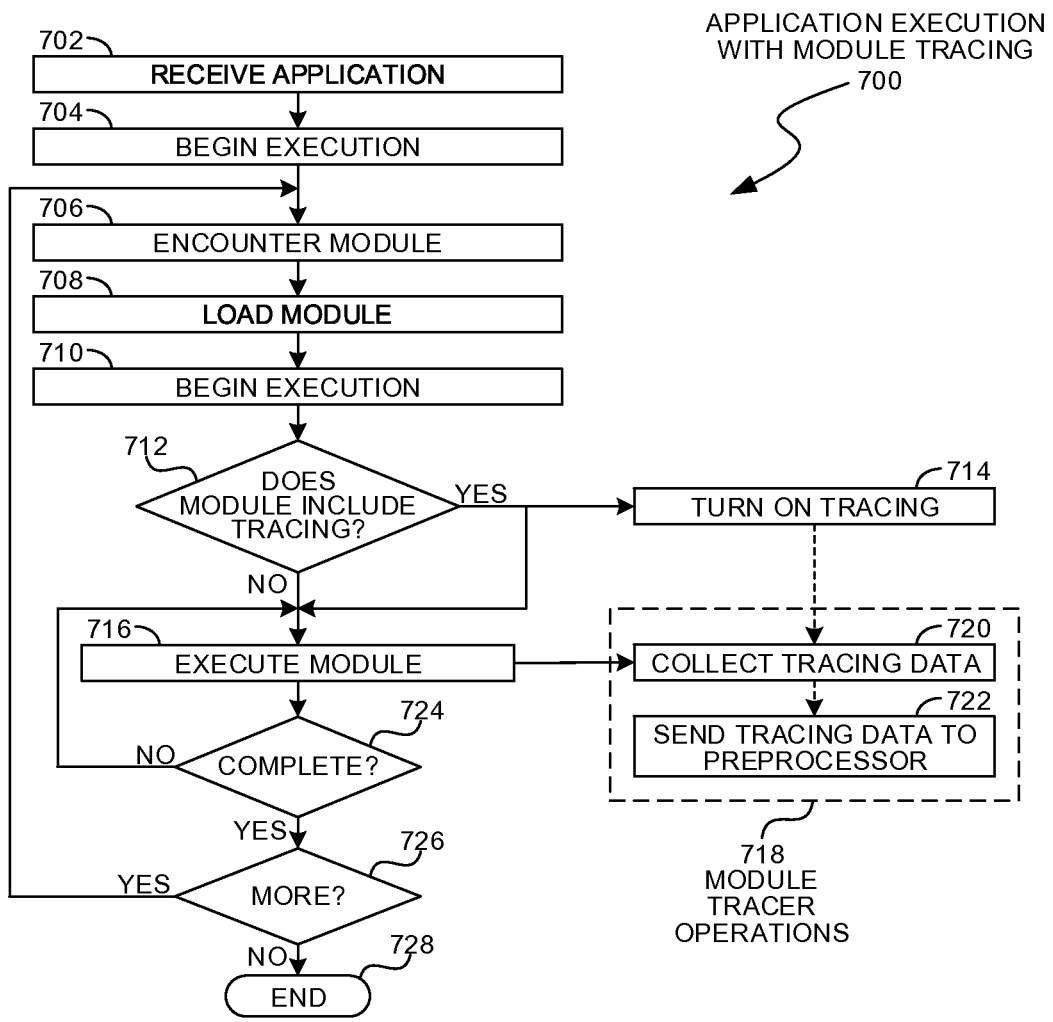
FIG. 7 is a flowchart illustration of an embodiment showing a method for application execution with module tracing.

FIG. 7 is a flowchart illustration of an embodiment 700 showing a method for executing applications with module tracing.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 700 illustrates how an application may be executed with module-specific tracing. The module-specific tracing may occur only when the module executes and may not operate when other portions of the application execute.

An application may be received in block 702 and begin execution in block 704. During execution, a module may be encountered in block 706. The module may be loaded in block 708 and begin execution in block 710.

If the module includes tracing in block 712, tracing may be turned on in block 714. The tracing may be performed by a separate thread or process, or may be incorporated into a single thread with the module itself. If the tracing is not included in the module, the tracing may not be turned on.

While the module executes in block 716, the module tracer operations in block 718 may be performed. The module tracer may collect tracing data in block 720 and send the tracer data to a preprocessor in block 722. In many embodiments, the tracer data may be sent to the preprocessor on a periodic basis, such as every second, every several seconds, every minute, or some other frequency.

The module processing may continue in block 724 by looping back to block 716. When the module is complete in block 724, processing may continue to block 726. When another module is encountered in block 726, the process may loop back to block 706. When processing is complete, the application may end in block 728.

Figure 8:
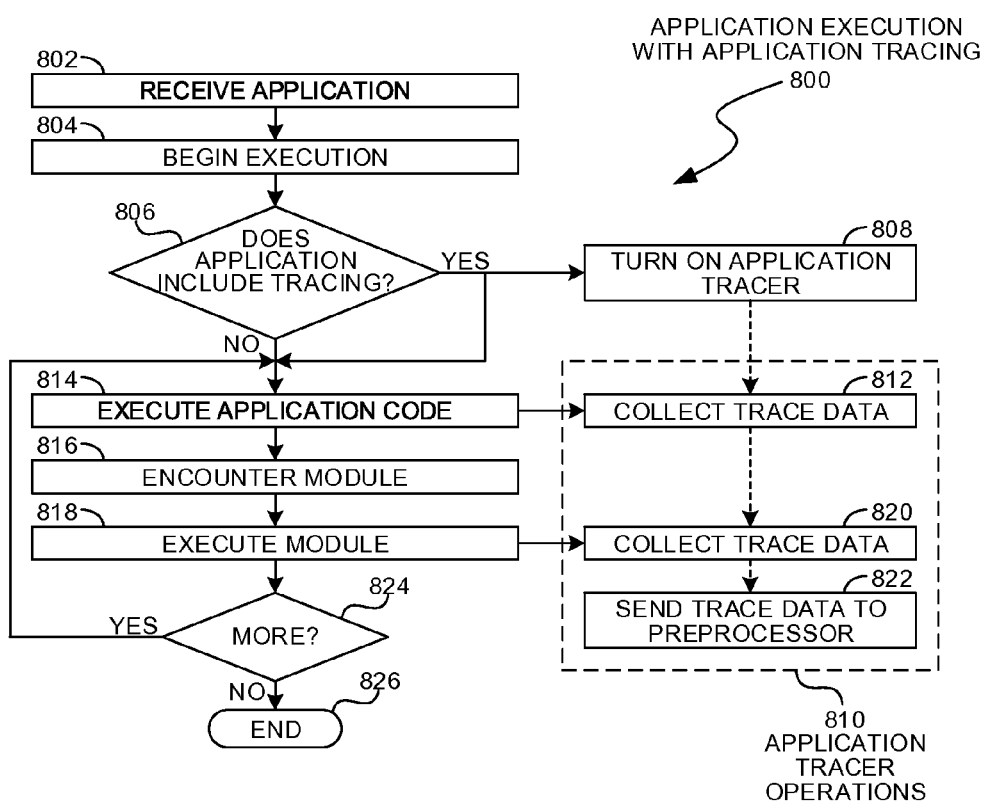
FIG. 8 is a flowchart illustration of an embodiment showing a method for application execution with application tracing.

FIG. 8 is a flowchart illustration of an embodiment 800 showing a method for executing applications with both application and module tracing.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 800 illustrates how an application may be executed with application-specific and module-specific tracing. Application-specific tracing may occur while the application executes, and module-specific tracing may occur while various modules execute. Embodiment 800 may be compared to embodiment 700 where module-specific tracing may occur without application-specific tracing.

An application may be received in block 802 and begin execution in block 804. When the application includes tracing in block 806, application tracing may begin in block 808. The operations of the tracer may be illustrated in block 810.

The application may be executed in block 814. While the application executes in block 814, the tracer may collect application-specific tracer data in block 812.

When the application encounters a module in block 816, the module may be executed in block 818. While the module executes in block 818, the tracer may collect tracer data in block 820.

During the tracer operations of block 810, the tracer may send tracer data to a preprocessor in block 822. The tracer data may be transmitted on a periodic basis, for example.

As more code is to be executed in block 824, the process may loop back to block 814, otherwise the application may end in block 826.

Figure 9:
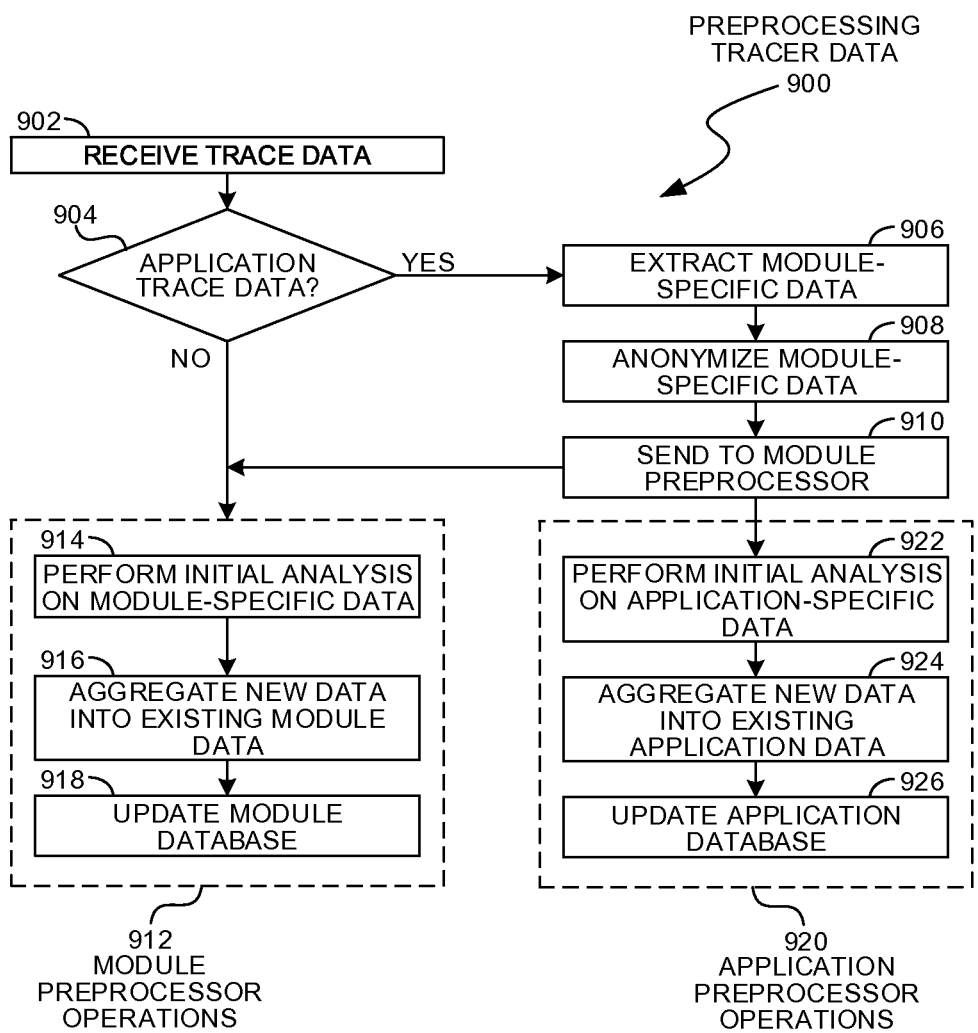
FIG. 9 is a flowchart illustration of an embodiment showing a method for preprocessing tracer data.

FIG. 9 is a flowchart illustration of an embodiment 900 showing a method for preprocessing tracer data. Embodiment 900 may be performed to gather tracer data and dispatch the data to the appropriate databases. The data may be further processed and analyzed by an analysis engine once the data are in the databases.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 900 is one example of a preprocessor. In many embodiments, the preprocessor may handle large volumes of data. Consequently, the preprocessor may perform a limited amount of analysis and may operate in a lightweight fashion. The operations of embodiment 900 may be performed on each packet or message sent from a tracer.

The trace data may be received in block 902. In many cases, the trace data may come in a packet, message, or other form that may contain a group of observations, metadata, and other information gathered by a tracer.

If the trace data is application trace data in block 904, the module-specific data may be extracted in block 906, anonymized in block 908, and sent to a module preprocessor in block 910. If the trace data is module trace data in block 904, the trace data is sent to the module preprocessor.

The extraction and anonymizing of module-specific data in blocks 906 and 908 may remove data that may identify the application, data handled by the application, or other information that may relate to the application. These data may, in some cases, be considered proprietary and therefore are removed prior to being added to the module database.

The operations of a module preprocessor are illustrated in block 912. An initial analysis of the module-specific data may be performed in block 914. The new data may be aggregated into existing module data in block 916, and the module database may be updated in block 918. The data in the module database may be further processed by an analysis engine to generate data viewable by the module developer as well as a wider audience, which may include the general public.

The application-specific data may be processed an application preprocessor as illustrated in block 920. An application preprocessor may perform initial analysis on the application data in block 922, aggregate the new data into existing application data in block 924, and update the application database in block 926.

Figure 10:
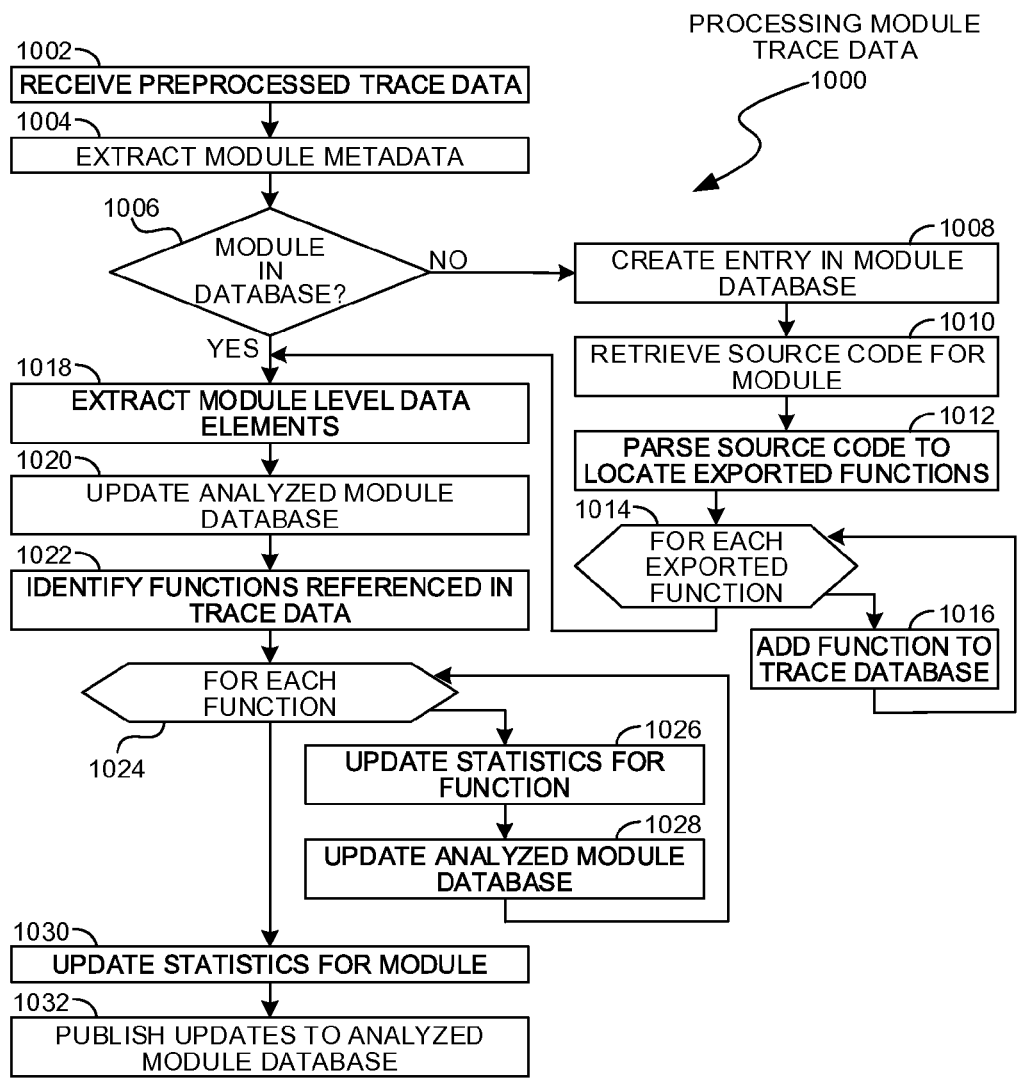
FIG. 10 is a flowchart illustration of an embodiment showing a method for processing module trace data.

FIG. 10 is a flowchart illustration of an embodiment 1000 showing a method for analyzing tracer data. Embodiment 1000 may be performed by an analysis engine to incorporate module trace data into an analyzed module database. From the analyzed module database, the data may be presented to a user with a user interface such as the user interface of embodiment 300.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Preprocessed trace data may be received in block 1002. The module metadata may be extracted from the data in block 1004.

If the module is not in the analyzed module database in block 1006, a process may be executed to add the module to the database beginning in block 1008.

In block 1008, an entry in the analyzed module database may be created. The source code for the module may be retrieved in block 1010 and parsed in block 1012 to locate the exported functions and other objects.

For each of the exported functions or other available objects in block 1014, the function or object may be added to the analyzed trace database in block 1016. The process may continue at block 1018.

If the module is in the database in block 1006, module level data elements may be extracted from the data in block 1018 and the analyzed module database may be updated in block 1020.

The functions or other objects in the data may be identified in block 1022. For each function in block 1024, the statistics relating to the function may be updated in block 1026 and the statistics used to update the analyzed module database in block 1028.

Any statistics for the module as a whole may be updated in block 1030 and the updates may be published in the analyzed module database in block 1032.

Figure 11:
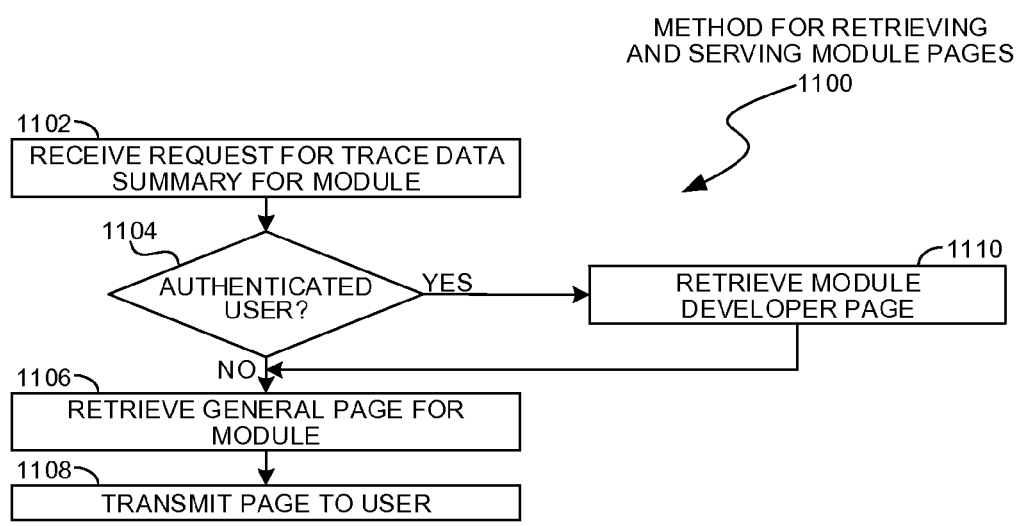
FIG. 11 is a flowchart illustration of an embodiment showing a method for processing requests for module data.

FIG. 11 is a flowchart illustration of an embodiment 1100 showing a method for servicing requests for data from analyzed trace data. Embodiment 1100 may be performed by a portal server in response to a request from a client device.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

A request may be received in block 1102 for summary data for a particular module. If the user is not an authenticated user in block 1104, the general data for the module may be retrieved in block 1106 and transmitted to the user in block 1108. If the user is an authenticated user in block 1104, the module developer data may be retrieved in block 1110 and transmitted in block 1108.

In the example of embodiment 1100, the notion of the data being delivered as a 'page' may refer to an example the delivery of the data in the form of a web page. Some embodiments may transmit the data in other manners to be rendered or presented to a user in a user interface.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed by at least one computer processor, said method comprising:
    receiving a first request for reusable module specific tracing data for a reusable module, said reusable module specific tracing data comprising use data and performance data for a plurality of reusable modules incorporated into a plurality of applications, said reusable module specific tracing data being stored in a reusable module specific tracing database, and said plurality of reusable modules comprising reusable code available in a repository;
    determining that said first request is not an authenticated request;
    returning a summary set of tracing data statistics for said reusable module for display in response to determining that said first request is not an authenticated request;
    receiving a second request for said reusable module specific tracing data for said reusable module;
    determining that said second request is an authenticated request; and
    returning a detailed set of tracing data statistics for said reusable module for display in response to determining that said second request is an authenticated request.

2. The method of claim 1 further comprising:
    receiving a third request for application specific tracing data for an application, said application specific tracing data comprising use data and performance data for said plurality of applications, and said application specific tracing data being stored in an application specific tracing database;
    determining that said third request is an authenticated request; and
    returning a detailed set of tracing data statistics for said application for display in response to determining that said third request is an authenticated request.

3. The method of claim 2, said detailed set of tracing data statistics for said reusable module comprising a list of functions and a set of tracing data statistics for each function in said list of functions.

4. The method of claim 3, said set of tracing data statistics for each function in said list of functions comprising usage statistics for each function in said list of functions.

5. The method of claim 4, said set of tracing data statistics for each function in said list of functions comprising performance statistics for each function in said list of functions.

6. The method of claim 5, said detailed set of tracing data statistics for said reusable module comprising a topology graph for said reusable module.

7. The method of claim 5, said detailed set of tracing data statistics for said reusable module comprising usage statistics for said reusable module.

8. The method of claim 3, said detailed set of tracing data statistics for said reusable module comprising a reliability factor.

9. The method of claim 8, said detailed set of tracing data statistics for said reusable module comprising said reliability factor for each function in said list of functions.

10. The method of claim 9, said detailed set of tracing data statistics for said reusable module comprising a single reliability factor for said reusable module.

11. The method of claim 10, said detailed set of tracing data statistics for said reusable module comprising a popularity factor for said reusable module.

12. The method of claim 11, said detailed set of tracing data statistics for said reusable module comprising a trending factor for said reusable module.

13. The method of claim 12, said detailed set of tracing data statistics for said reusable module comprising dataset information.

14. The method of claim 13, said dataset information comprising a number of datasets analyzed to generate said detailed set of tracing data statistics for said reusable module.

15. The method of claim 14, said dataset information comprising a number of applications analyzed to generate said detailed set of tracing data statistics for said reusable module.

* * * * *